United States Patent
Oremus (10) Patent No.: US 9,812,016 B2
(45) Date of Patent: Nov. 7, 2017

(54) DEVICE AND METHOD FOR ASSESSING ACCIDENT RISKS TO A MOVING VEHICLE

(71) Applicant: SCANIA CV AB, Södertälje (SE)

(72) Inventor: Bas Oremus, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/406,885

(22) PCT Filed: Jun. 26, 2013

(86) PCT No.: PCT/SE2013/050772
§ 371 (c)(1),
(2) Date: Dec. 10, 2014

(87) PCT Pub. No.: WO2014/007726
PCT Pub. Date: Jan. 9, 2014

(65) Prior Publication Data
US 2015/0161892 A1    Jun. 11, 2015

(30) Foreign Application Priority Data

Jul. 2, 2012 (SE) .................................. 1250747

(51) Int. Cl.
*G08G 1/00* (2006.01)
*G08G 1/16* (2006.01)
(Continued)

(52) U.S. Cl.
CPC .............. *G08G 1/16* (2013.01); *B60Q 1/525* (2013.01); *B60Q 5/006* (2013.01); *B60W 30/08* (2013.01);
(Continued)

(58) Field of Classification Search
CPC ....... B60W 2050/143; B60W 2420/42; B60W 2420/52; B60W 30/08; B60W 30/095;
(Continued)

(56) References Cited

U.S. PATENT DOCUMENTS

| 5,680,123 A | 10/1997 | Lee ................................. 340/937 |
| 5,808,728 A * | 9/1998 | Uehara ..................... B60T 7/22 180/169 |

(Continued)

FOREIGN PATENT DOCUMENTS

| DE | 101 03 767 A1 | 9/2002 |
| DE | 10 2010 007 884 A1 | 12/2010 |

(Continued)

OTHER PUBLICATIONS

International Search Report dated Oct. 21, 2013 issued in corresponding International patent application No. PCT/SE2013/050772.

(Continued)

*Primary Examiner* — Naomi Small
(74) *Attorney, Agent, or Firm* — Ostrolenk Faber LLP (57) ABSTRACT

A method for assessing accident risks to a moving vehicle (100; 110) includes continuously monitoring (s410) a surroundings configuration while the vehicle (100; 110) is in motion, continuously determining (s420) running characteristics for the vehicle (100; 110), continuously registering (s430) the surroundings configuration in order to create and provide an idea about chosen characteristics of the surroundings passed by the vehicle using the running characteristics and the idea as a basis for assessing (s440) accident risks related to the surroundings passed by the vehicle (100; 110). Also a computer program product includes program code (P) for a computer (200; 210) for implementing the method. Also the device and a vehicle equipped with the device.

15 Claims, 4 Drawing Sheets

(51) Int. Cl.
*B60W 30/095* (2012.01)
*B60W 30/08* (2012.01)
*B60Q 1/52* (2006.01)
*B60Q 5/00* (2006.01)
*B60W 50/14* (2012.01)

(52) U.S. Cl.
CPC ...... *B60W 30/095* (2013.01); *B60W 30/0953* (2013.01); *G08G 1/165* (2013.01); *G08G 1/166* (2013.01); *B60R 2300/301* (2013.01); *B60W 50/14* (2013.01); *B60W 2050/143* (2013.01); *B60W 2420/42* (2013.01); *B60W 2420/52* (2013.01); *B60W 2550/00* (2013.01)

(58) Field of Classification Search
CPC .... B60W 30/0953; B60W 50/14; G08G 1/16; G08G 1/165; G08G 1/166
USPC .......................................................... 340/901
See application file for complete search history.

(56) References Cited

U.S. PATENT DOCUMENTS

| | | | |
|---|---|---|---|
| 7,109,854 B2* | 9/2006 | Dobler | G08G 1/166 340/435 |
| 9,120,484 B1* | 9/2015 | Ferguson | G05D 1/0055 |
| 2003/0141965 A1* | 7/2003 | Gunderson | B60R 21/013 340/431 |
| 2004/0030498 A1* | 2/2004 | Knoop | B60T 7/22 701/301 |
| 2004/0075544 A1* | 4/2004 | Janssen | G08G 1/167 340/435 |
| 2005/0134440 A1* | 6/2005 | Breed | B60N 2/2863 340/435 |
| 2005/0143918 A1* | 6/2005 | Hilliard | G01S 19/52 701/301 |
| 2005/0190952 A1* | 9/2005 | Nagasawa | B60R 1/00 382/103 |
| 2006/0041381 A1* | 2/2006 | Simon | G01S 13/931 701/301 |
| 2008/0084283 A1* | 4/2008 | Kalik | B60Q 9/00 340/435 |
| 2009/0164063 A1 | 6/2009 | Piccinini et al. | 701/37 |
| 2012/0083960 A1 | 4/2012 | Zhu | 701/23 |

FOREIGN PATENT DOCUMENTS

| | | |
|---|---|---|
| DE | 10 2009 035 072 A1 | 2/2011 |
| DE | 10 2010 023 164 A1 | 12/2011 |
| EP | 0 729 861 A2 | 9/1996 |
| EP | 2 113 436 A1 | 11/2009 |
| EP | 2 436 572 A1 | 4/2012 |
| EP | 2 555 519 A1 | 2/2013 |
| WO | WO 2011/118260 A1 | 9/2011 |
| WO | WO 2011/157288 | 12/2011 |

OTHER PUBLICATIONS

Korean Office Action, dated Nov. 19, 2015, issued in corresponding Korean Patent Application No. 10-2015-7002843. English translation. Total 16 pages.

Supplementary European Search Report dated Apr. 18, 2017 in corresponding European Patent Application No. EP 13 81 2693.

* cited by examiner

DEVICE AND METHOD FOR ASSESSING ACCIDENT RISKS TO A MOVING VEHICLE

CROSS-REFERENCE TO RELATED APPLICATIONS

The present application is a 35 U.S.C. §§371 National Phase conversion of PCT/SE2013/050772, filed Jun. 26, 2013, which claims priority of Swedish Patent Application No. 1250747-1, filed Jul. 2, 2012, the contents of which are incorporated by reference herein. The PCT International Application was published in the English language.

TECHNICAL FIELD

The present invention relates to a method for assessing accident risks to a moving vehicle. The invention relates also to a computer program product comprising program code for a computer for implementing a method according to the invention. The invention also relates to a device for assessing accident risks to a moving vehicle and a vehicle equipped with the device.

BACKGROUND

During operation of vehicles, e.g. heavy vehicles such as trucks, there may in certain traffic situations be increased risk of colliding with various objects or structures. Collision risk may be greater during vehicle operation in densely built-up areas.

There are today systems which can warn a driver whose vehicle is moving closer to a vehicle ahead. In certain cases, a control system of the vehicle automatically applies braking action of vehicle brakes if there is increased risk of colliding with vehicles ahead. Vehicles are also for example provided with support systems which can actively provide warnings if a distance sensor detects that a distance from the vehicle to an object is below a specified threshold value.

There is nevertheless always a need in the vehicle industry to further develop existing alarm systems in order to achieve improved traffic safety.

WO 2011/157288 describes a system for detecting locations, timetables and travelling times in order to use historical journey data to estimate barrier crossings, e.g. relating to ferry traffic, using a digital map.

SUMMARY OF THE INVENTION

One object of the present invention is to propose a novel and advantageous method for assessing accident risks to a moving vehicle.

Another object of the invention is to propose a novel and advantageous device and a novel and advantageous computer program for assessing accident risks to a moving vehicle.

A further object of the invention is propose a method, a device and a computer program for achieving increased safety of a moving vehicle.

A further object of the invention is propose a method, a device and a computer program for achieving robust and reliable assessment of risks of colliding with stationary objects.

These objects are achieved with a method for assessing accident risks to a moving vehicle according to claim 1.

One aspect of the invention is a proposed method for assessing accident risks to a moving vehicle, comprising the steps of continuously monitoring a surroundings configuration while said vehicle is in motion, continuously determining running characteristics for the vehicle, continuously registering said surroundings configuration in order to create and provide an idea about chosen characteristics of surroundings passed by the vehicle, and using said running characteristics and said idea as a basis for assessing accident risks related to surroundings passed by the vehicle.

By saving and reusing information about surroundings configurations it is possible to achieve a method for assessment of risks of colliding with fixed objects. The innovative method thus provides a driver of a vehicle with a robust warning system and support for decisions.

Said assessment may comprise taking vehicle configurations into account, making it possible for assessments of collision risks to be conducted on the basis of configurations specific to the vehicle, resulting in further increased safety according to one aspect of the innovative method.

Said running characteristics may comprise coming movement paths, with the consequent advantageous possibility of predicting a future collision with a fixed object and thereby enabling a driver of the vehicle to adopt suitable measures before a potential collision.

Accident risks may be presented for an operator of the vehicle, making it possible to present for a driver of the vehicle a good basis for deciding on measures.

Said chosen characteristics of the surroundings passed by the vehicle may comprise locations and configurations of fixed objects in said surroundings, making it possible to provide a clear picture of fixed objects in a surroundings configuration which involve collision risks.

The method is easy to implement in existing motor vehicles. Software for assessing accident risks to a moving vehicle according to the invention may be installed in a control unit of the vehicle during the manufacture of the vehicle. A purchaser of the vehicle may thus have the possibility of selecting the function of the method as an option. Alternatively, software which comprises program code for conducting the innovative method for assessing accident risks to a moving vehicle may be installed in a control unit of the vehicle on the occasion of upgrading at a service station, in which case the software may be loaded into a memory in the control unit. Implementing the innovative method is therefore cost-effective, particularly since no further sensors or components need be installed in the vehicle, according to one aspect of the invention. Relevant hardware may today already be provided on board the vehicle. The invention therefore represents a cost-effective solution to the problems indicated above.

Software which comprises program code for assessing accident risks to a moving vehicle is easy to update or replace. Moreover, different parts of the software which comprises program code for assessing accident risks to a moving vehicle may be replaced independently of one another. This modular configuration is advantageous from a maintenance perspective.

One aspect of the invention is a proposed device for assessing accident risks to a moving vehicle, comprising means for continuously monitoring a surroundings configuration while said vehicle is in motion, means for continuously determining running characteristics for the vehicle, means for continuously registering said surroundings configuration in order to create and provide an idea about chosen characteristics of the surroundings passed by the vehicle, and means for using said running characteristics and said idea as a basis for assessing accident risks related to the surroundings passed by the vehicle.

Said means for assessing accident risks may be adapted to taking said vehicle configurations into account.

Said running characteristics may comprise coming movement paths. Said chosen characteristics of the surroundings passed by the vehicle may comprise locations and configurations of fixed objects in said surroundings.

The device may further comprise means for presenting accident risks for an operator of the vehicle.

The above objects are also achieved with a vehicle which is provided with the device for assessing accident risks to a moving vehicle. The vehicle may be a truck, bus or car.

One aspect of the invention is a proposed computer program for assessing accident risks to a moving vehicle, which program comprises program code for causing an electronic control unit or another computer connected to the electronic control unit to perform steps according to the invention.

One aspect of the invention is a proposed computer program for assessing accident risks to a moving vehicle, which program comprises program code stored on a computer-readable medium for causing an electronic control unit or another computer connected to the electronic control unit to perform steps according to the invention.

One aspect of the invention is a proposed computer program product comprising a program code stored on a computer-readable medium for performing method steps according to the invention when said computer program is run on an electronic control unit or another computer connected to the electronic control unit.

In one aspect of the invention it is possible to use sensors directed forwards, e.g. one or more video cameras and/or cameras and/or one or more radar units. This makes it possible to reuse registered and saved data generated by said forward-directed sensors at a later stage, e.g. when a trailer of the vehicle is passing stationary objects already detected, or when the vehicle is reversing.

The invention thus differs from existing systems in which for example an emergency brake function may be activated on the basis of information from forward-directed sensors where there is risk of collision with a movable or stationary object, when said object is still within an active visual field of the forward-directed sensors.

The invention thus provides the advantageous possibility of using previously registered information about stationary objects in a surroundings configuration in situations where said sensors do not have said objects in any of their visual fields.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations within other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations are used for similar items in the various diagrams, FIG. 1 schematically illustrates a vehicle according to an embodiment of the invention, FIG. 2 schematically illustrates a subsystem for the vehicle depicted in FIG. 1, according to an embodiment of the invention, FIG. 3a schematically illustrates a first example of a traffic situation, FIG. 3b schematically illustrates a second example of a traffic situation.

DETAILED DESCRIPTION OF THE DRAWINGS

Figure 1:
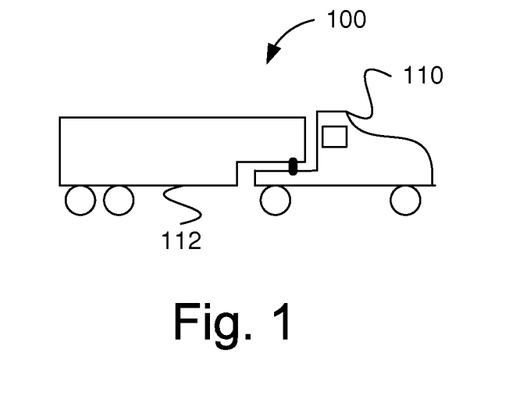

FIG. 1 depicts a side view of a vehicle 100. The vehicle here exemplified comprises a tractor unit 110 and a trailer 112. It may be a heavy vehicle, e.g. a truck or a bus. It may alternatively be a car.

The term "link" refers herein to a communication link which may be a physical connection such as an opto-electronic communication line, or a non-physical connection such as a wireless connection, e.g. a radio link or microwave link.

Figure 2:
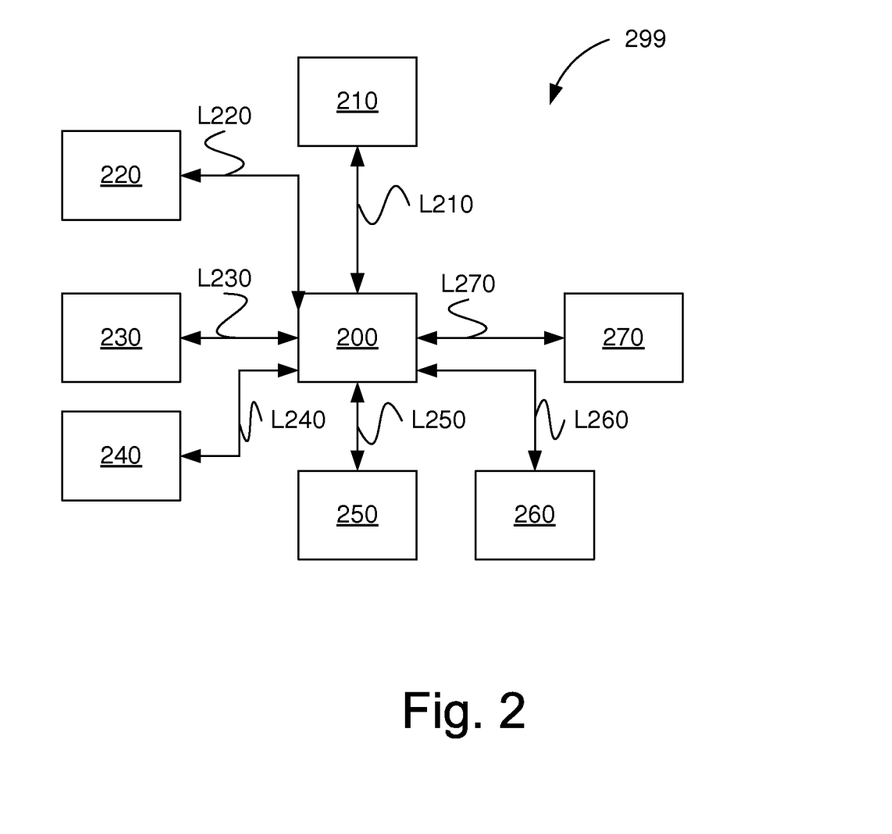

FIG. 2 depicts a subsystem 299 of the vehicle 100. This subsystem is situated in the tractor unit 110 and comprises a first control unit 200.

The first control unit 200 is arranged for communication with a first sensor device 220 via a link L220. The first sensor device may comprise a camera unit. The camera unit may be a mono-camera. The camera unit may be a stereo-camera. Said first sensor device 220 is adapted to continuously generate images of surroundings of the vehicle 100. It may be adapted to generate images of surroundings of the vehicle in real time. It is alternatively adapted to intermittently generate images of surroundings of the vehicle. It may be adapted to continuously film surroundings of the vehicle as a video stream.

The first sensor device 220 may comprise a suitable number of image-generating units which may be mutually different, e.g. as regards visual fields and other facilities. In one example said first sensor device comprises a first camera with a visual field of 45 degrees and a range of up to 100 meters, and a second camera with a visual field of 30 degrees and a range of up to 200 meters. Said first and second cameras may have suitable respective visual fields and ranges. The visual fields of different image-generating units may overlap in whole or in part.

Said first sensor device 220 is adapted to continuously send said images generated to the first control unit 200 via the link L220. Said first sensor device is adapted to continuously send said video stream generated to the first control unit via the link L220.

The first control unit 200 is arranged for communication with a second sensor device 230 via a link L230. Said second sensor device may comprise a radar unit. The radar unit may be a mono-radar. It may be a stereo-radar. Said second sensor device is adapted to continuously generate radar images of surroundings of the vehicle 100. It may be adapted to generate radar images of surroundings of the vehicle in real time. Said second sensor device is alternatively adapted to intermittently generate radar images of surroundings of the vehicle.

The second sensor device 230 may comprise a suitable number of radar units which may be mutually different, e.g. as regards visual field and other facilities. In one example said second sensor device comprises a first radar unit with a visual field of 50 degrees and a range of up to 60 meters, and a second radar unit with a visual field of 10 degrees and a range of up to 120 meters. Said first and second radar units may have respective suitable visual fields and ranges. The visual fields of different radar units may overlap in whole or in part.

Said second sensor device 230 is adapted to continuously send said radar images generated to the first control unit 200 via the link L230.

The first control unit 200 is adapted to receive signals comprising data from said first sensor device 220 and said second sensor device 230.

The first control unit 200 is adapted to process said signals received from said first sensor device 220 in order to detect a surroundings configuration comprising information about the locations and configurations of fixed objects. Said fixed objects may for example be a sidewalk edge or a freight loading platform. They may be road signs, central reservations, buildings, parked vehicles etc. Said first control unit is adapted to storing said images received and/or said surroundings configuration detected in a memory with which it is provided.

The first control unit 200 is adapted to process said signals received from said second sensor device 230 in order to detect a surroundings configuration comprising information about the locations and configurations of fixed objects. Said fixed objects may for example be a sidewalk edge or a freight loading platform. They may be road signs, central reservations, buildings, parked vehicles etc. Said first control unit is adapted to store said images received and/or said surroundings configuration detected in a memory with which it is provided.

Alternatively, image processing may be performed by said first sensor device 220 and/or said second sensor device 230, in which case either or both of them may detect said surroundings configuration and pass information about it on to the first control unit via the respective links L220, L230.

The first control unit 200 is arranged for communication with positioning means 240 via a link L240. Said positioning means are adapted to continuously determine a prevailing location of the vehicle. They may comprise a GPS receiver. They may comprise a suitable gyro device. Said positioning means are adapted to continuously determine a prevailing orientation of the vehicle, e.g. relative to a north direction. They are adapted to continuously send signals containing information about a prevailing location and orientation of the vehicle to the first control unit via the link L240.

The first control unit 200 is arranged for communication with a third sensor device 250 via a link L250. Said third sensor device is adapted to continuously determine a number of different vehicle parameters which may comprise the vehicle's prevailing yaw angle, prevailing yaw rate, prevailing steering wheel angle, prevailing vehicle speed, prevailing wheel speed etc. Said vehicle parameters may be used by the first control unit to calculate running characteristics for the vehicle. The first control unit is thus adapted to calculate a coming movement path for the vehicle. A coming probable movement path may thus be predicted. Said first control unit is adapted to calculate said running characteristics on the basis of at least one vehicle parameter.

The first control unit 200 is arranged for communication with a communication unit 260 via a link L260. Said communication unit may comprise a suitable user interface which enables an operator of the vehicle to input for example information about vehicle configurations, which may comprise information about the vehicle's total length, type of trailer 112, any overhang etc. An operator of the vehicle may where appropriate update information about vehicle configurations to make it possible to make proper assessments of accident risks to a moving vehicle. Said communication unit may comprise a set of push-buttons, viewing screen, touchscreen or other suitable means for interacting with the first control unit. In one example necessary information about vehicle configurations is pre-stored in a memory of the first control unit.

The first control unit 200 is arranged for communication with feedback means 270 via a link L270. Said feedback means may be integrated with said communication unit 260 or constitute a separate unit. They may comprise a viewing screen, loudspeakers or light devices. The first control unit is adapted to make an operator of the vehicle aware that there is an accident risk to the moving vehicle.

In one embodiment said feedback means 270 may be adapted to present by means of said viewing screen an image representing the vehicle and illustrating an area of the vehicle where there is risk of collision with a fixed object.

In one embodiment said feedback 270 means may be adapted to deliver by means of said loudspeakers an auditory signal when there is risk of collision with a fixed object. Said auditory signal may comprise synthesised speech or a continuous or intermittent sound signal.

In one embodiment said feedback means 270 may be adapted to deliver a continuous or intermittent light signal, e.g. by means of a lamp or LED, when there is risk of collision with a fixed object.

A second control unit 210 is arranged for communication with the first control unit 200 via a link L210. Said second control unit may be detachably connected to the first control unit. It may be external to the vehicle. It may be adapted to conduct the innovative method steps according to the invention. It may be used to cross-load software to the first control unit, particularly software for conducting the innovative method. It may alternatively be arranged for communication with the first control unit via an internal network on board the vehicle. It may be adapted to perform functions substantially similar to the first control unit, e.g. to using the signals received comprising surroundings images (e.g. video or radar images) which contain information about surroundings configurations, information concerning the location and orientation of the vehicle, and running characteristics, as a basis for assessing accident risks to a moving vehicle.

Figure 3A:
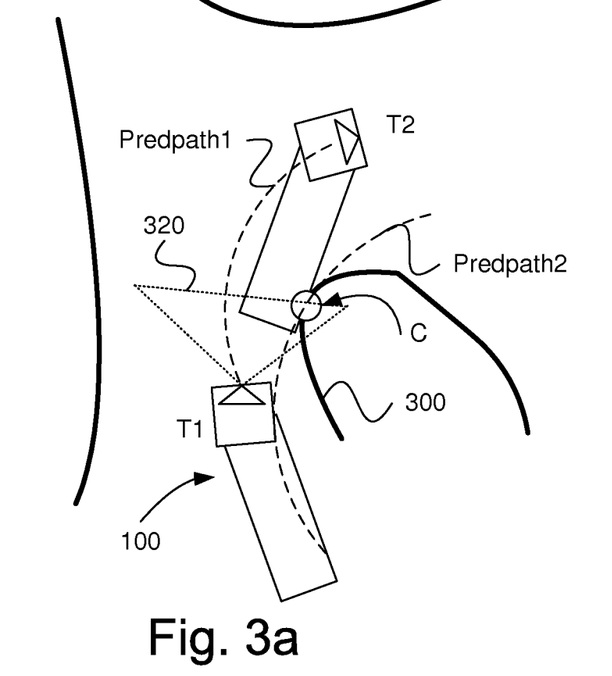

FIG. 3*a* illustrates schematically a first example of a traffic situation. It shows the vehicle 100 at a first time T1 and a subsequent second time T2. A driver of the vehicle here intends to execute a turning maneuver to the right in the diagram in order to go round a raised curb 300 which may be identified as a fixed object, e.g. a sidewalk edge.

Before the first time T1, a surroundings configuration is continuously monitored while said vehicle is in motion, by means of said first sensor device 220 and/or said second sensor device 230. A visual field 320 for the first sensor device at a given time is illustrated. Before the first time T1 running characteristics for the vehicle are continuously determined. Before the first time T1 said surroundings configuration is continuously registered in order to create and provide an idea about chosen characteristics of the surroundings passed by the vehicle.

At the first time T1 the first control unit makes a calculation of a predicted movement path Predpath1 for the vehicle on the basis of the vehicle parameters described above. In addition, the risk of colliding with the fixed object 300 is continuously calculated on the basis inter alia of vehicle configurations, predicted movement paths and surroundings configurations. The risk of colliding with the fixed object may be calculated continuously after time T1 and before the second time T2.

In this example the first control unit 200 determines that the driver of the vehicle seems to be executing a turning maneuver which will entail risk of an area C of the vehicle colliding with the fixed object 300, whereupon the driver may be warned automatically by means of the feedback means 270 before time T2. This enables the driver to avoid said potential collision by a suitable maneuver, e.g. by steering further out during the turning maneuver and/or by braking.

In this context, image history, i.e. processed images generated by said first sensor device 220 and/or said second sensor device 230, serves as a basis for calculating the risk of colliding with a fixed object which has been passed by the driver. The processed images generated by said first sensor device and/or said second sensor device may in one aspect of the invention be saved in a memory of the first control unit and be used at a later stage for assessing the risk of colliding with a fixed object in a surroundings configuration. Knowledge of vehicle configurations makes it possible to calculate a predicted movement path Predpath2 for critical parts of the vehicle 100. This predicted movement path Predpath2 is determined in this example to be on the "wrong" side of the fixed object 300, making it possible to determine future collision risk (at time T2).

Figure 3B:
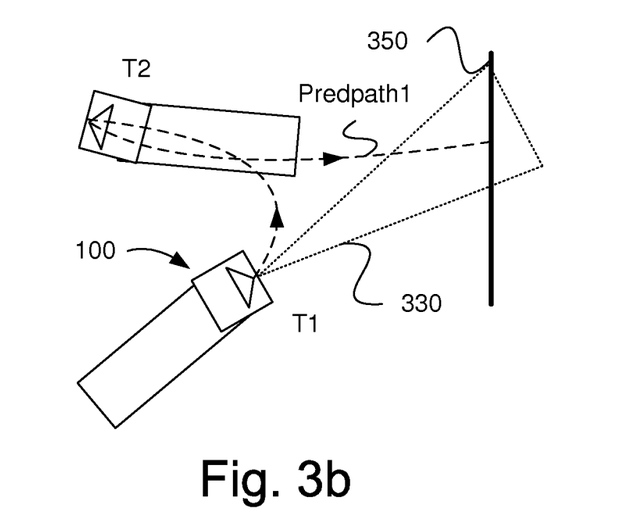

FIG. 3b illustrates schematically a second example of a traffic situation. It shows the vehicle 100 at a first time T1 and a subsequent second time T2. A driver of the vehicle here intends to turn and reverse towards a fixed object 350 in the form of a freight loading platform.

Before the first time T1, a surroundings configuration is continuously monitored while said vehicle is in motion, by means of said first sensor device 220 and/or said second sensor device 230. A visual field 330 for the second sensor device 230 at a given time is illustrated. Before the first time T1 said surroundings configuration is continuously registered in order to create and provide an idea about chosen characteristics of the surroundings passed by the vehicle.

At the second time T2 the first control unit makes a calculation of a predicted movement path Predpath1 for the vehicle on the basis of vehicle parameters as described above. In addition, the risk of colliding with the fixed object 350 is continuously calculated on the basis inter alia of vehicle configurations, predicted movement paths and surroundings configurations. After the second time T2 running characteristics for the vehicle are continuously determined. The risk of colliding with the fixed object may be calculated continuously after time T2.

In this example the first control unit determines that the driver of the vehicle seems to be executing a reversing maneuver which will involve risk of colliding with the fixed object 350, whereupon the driver may be warned automatically by the feedback means 270 before said potential collision takes place. The driver is thus enabled to avoid said potential collision by a suitable maneuver, e.g. by reversing slowly and keeping a good look-out behind.

In this context, image history, i.e. processed images generated by said first sensor device 220 and/or said second sensor device 230, serves as a basis for calculating the risk of colliding with a fixed object which has been passed by the driver. The processed images generated by said first sensor device and/or said second sensor device may in one aspect of the invention be saved in a memory of the first control unit and be used at a later stage for assessing the risk of colliding with a fixed object in a surroundings configuration. Knowledge of vehicle configurations makes it possible to calculate a predicted movement paths for critical parts (rear end of trailer) of the vehicle.

Figure 4A:
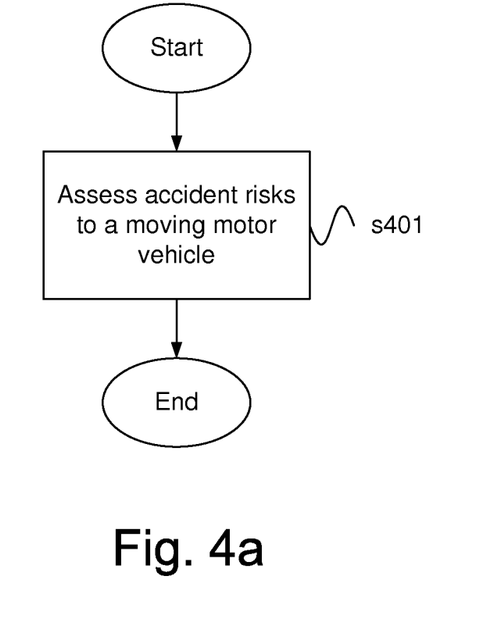
FIG. 4a is a schematic flowchart of a method according to an embodiment of the invention.

FIG. 4a is a schematic flowchart of a method for assessing accident risks to a moving vehicle according to an embodiment of the invention. The method comprises a first step s401 comprising the steps of
  continuously monitoring a surroundings configuration while said vehicle is in motion,
  continuously determining running characteristics for the vehicle,
  continuously registering said surroundings configuration in order to create and provide an idea about chosen characteristics of the surroundings passed by the vehicle, and
  using said running characteristics and said idea as a basis for assessing accident risks related to surroundings passed by the vehicle. The method ends after step s401.

Figure 4B:
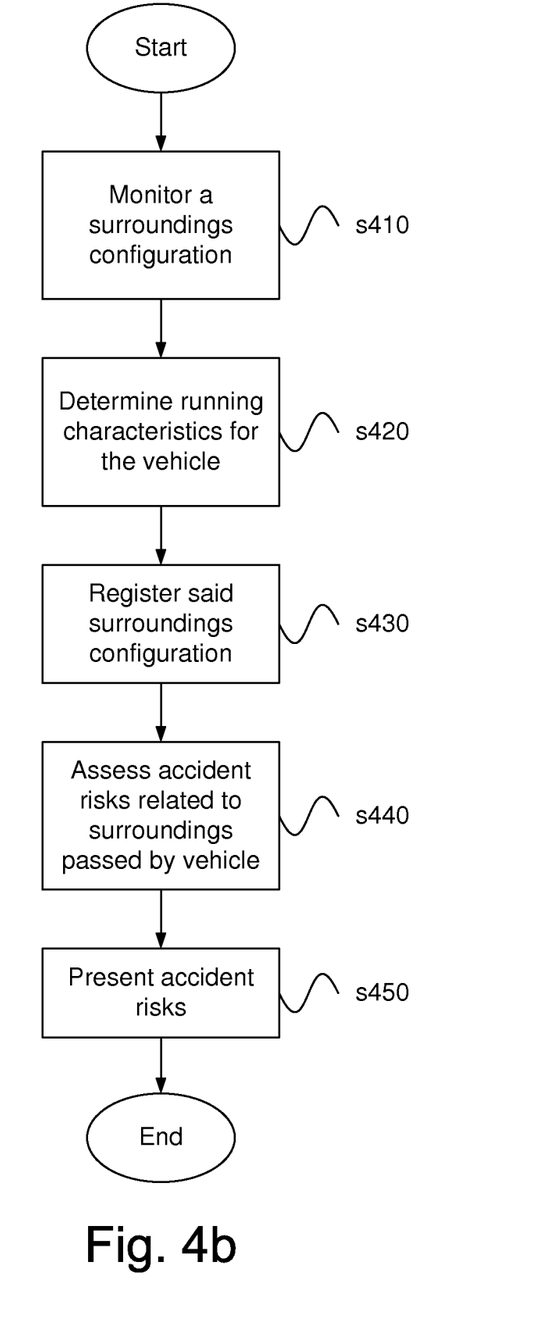
FIG. 4b is a more detailed schematic flowchart of a method according to an embodiment of the invention, and FIG. 5 schematically illustrates a computer according to an embodiment of the invention.

FIG. 4b is a schematic flowchart of a method for assessing accident risks to a moving vehicle according to an embodiment of the invention.

The method comprises a first step s410 comprising the step of continuously monitoring a surroundings configuration while said vehicle is in motion. This may be performed by means of the first sensor device 220 and/or the second sensor device 230. Step s410 is followed by a step s420.

Method step s420 comprises the step of continuously determining running characteristics for the vehicle. This may be performed by using said positioning means 240 and said third sensor means 250. Step s420 is followed by a step s430.

Method step s430 comprises the step of continuously registering said surroundings configuration in order to create and provide an idea about chosen characteristics of the surroundings passed by the vehicle. Step s430 may comprise images of said surroundings configuration monitored being processed and being saved in a memory in the first control unit 200. Said chosen characteristics may pertain to fixed objects such as traffic signs and sidewalk edges. They may be chosen manually by means of the communication unit 260 or be pre-stored in a memory in the control unit 200. Step s430 is followed by a step s440.

Method step s440 comprises the step of using said running characteristics and said idea as a basis for assessing accident risks related to surroundings passed by the vehicle. Step s440 is followed by a step s450.

Method step s450 comprises the step of presenting accident risks for an operator of the vehicle, e.g. by using said feedback means 270. The method ends after step s450.

Figure 5:
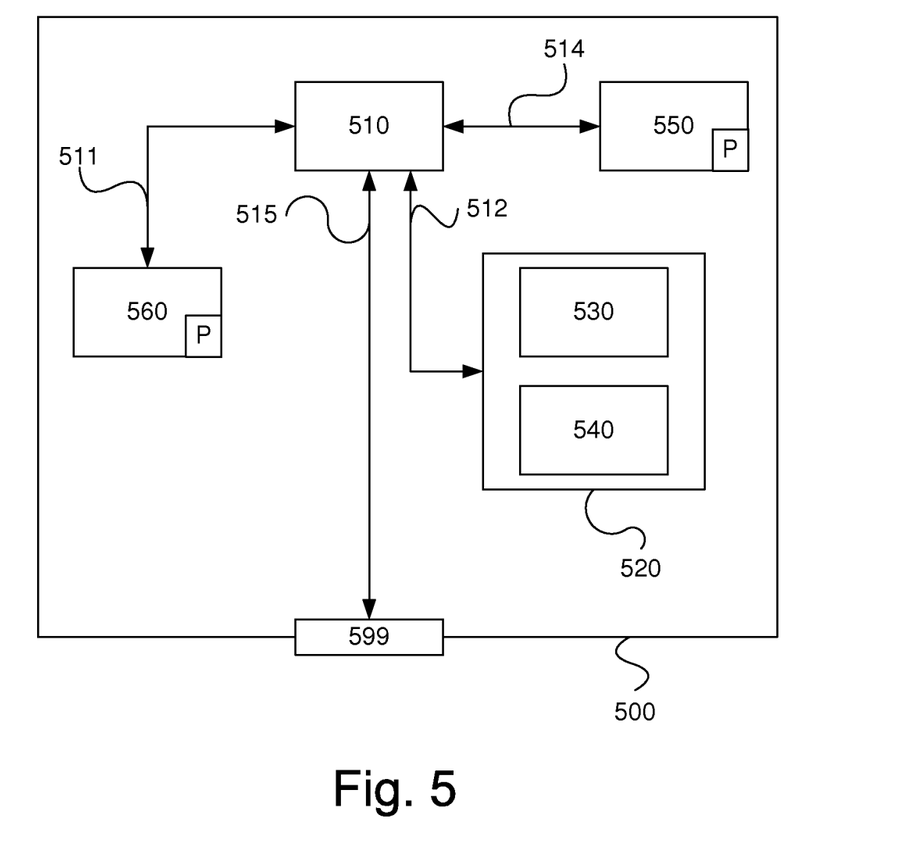

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A proposed computer program P comprises routines for assessing accident risks to the vehicle 100 when it is in motion, according to the innovative method.

The program P comprises routines for continuously monitoring a surroundings configuration while said vehicle is in motion. It comprises routines for continuously determining running characteristics for the vehicle. It comprises routines for continuously registering said surroundings configuration in order to create and provide an idea about chosen characteristics of the surroundings passed by the vehicle. It comprises routines for using said running characteristics and said idea as a basis for assessing accident risks relating to surroundings passed by the vehicle.

The program P comprises routines for making said assessments on the basis of vehicle configurations. It comprises routines for calculating the vehicle's future movement paths. It comprises routines for presenting accident risks for an operator of the vehicle. It comprises routines for making said assessments on the basis of information about locations and configurations of fixed objects in said surroundings.

The program P may be stored in an executable form or in compressed form in a memory 560 and/or in a read/write memory 550.

Where it is stated that the data processing unit 510 performs a certain function, it means that it conducts a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is arranged to communicate with the data processing unit 510 via a data bus 514. The links L210, L220, L230, L240, L250, L260 and L270, for example, may be connected to the data port (see FIG. 2).

When data are received on the data port 599, they are stored temporarily in the second memory element 540. When input data received have been temporarily stored, the data processing unit 510 will be prepared to conduct code execution as described above.

An electronic map may be stored in the memory 560. The vehicle's situation as regards location and orientation may be determined on the basis of information determined by using said positioning means and/or said third sensor device.

Information about vehicle parameters and vehicle configurations may be stored in the memory 560 and may be updated manually by means of said communication unit 260, which may for example take place at the time of coupling a trailer 112 to the tractor unit 110.

In one version, signals received on the data port 599 contain information about an environment configuration. Said signals may be images generated by the first sensor device 220 and/or the second sensor device 230. Information about environment configurations may be saved in suitable ways in the first control unit 200. In one version, images generated by the first sensor device and/or the second sensor device are stored for one minute. In one version, images generated by the first sensor device and/or the second sensor device are stored for five minutes. In one version, images generated by the first sensor device and/or the second sensor device are stored for a suitable period of time, e.g. 10 seconds, 30 seconds or 10 minutes. Said saved images may serve as a basis for assessing collision risks according to one aspect of the invention.

In one version, signals received on the data port 599 contain information about yaw angle, yaw rate, steering wheel angle, wheel speed, vehicle speed and vehicle acceleration.

In one version, signals received on the data port contain information about locations determined by a positioning means 240.

The signals received on the data port 599 may be used by the device 500 for assessing accident risks to a moving vehicle, according to the innovative method.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and their practical applications and thereby make it possible for one skilled in the art to understand the invention for different embodiments and with the various modifications appropriate to the intended use.

The invention claimed is:

1. A method for assessing accident risks to a moving vehicle comprising the steps of:
   continuously monitoring, by at least one sensor device, a surroundings configuration of said vehicle while said vehicle is in motion;
   continuously registering, by a control unit, said surroundings configuration in order to create and provide an idea about chosen characteristics of said surroundings passed by said vehicle;
   continuously determining, by the control unit, running characteristics of said vehicle;
   using said running characteristics and said idea as a basis for assessing, by the control unit, accident risks of said vehicle related to a portion of said surroundings which will be or has been passed by a front of said vehicle, said accident risks including a risk of colliding with a fixed object, which will be or has been passed by said front of said vehicle, when said fixed object is located behind said front of said vehicle; and
   calculating said risk of colliding with said fixed object continuously beginning, at a first time, when said fixed object is located in front of said vehicle and ending, at a second time, when said fixed object is located behind said front of said vehicle,
   wherein said second time is determined at said first time based on a predicted path of said vehicle and on said risk of colliding with said fixed object calculated at said first time.

2. The method according to claim 1, in which said assessing comprises taking configurations of said vehicle into account.

3. The method according to claim 1, in which said running characteristics comprise future movement paths.

4. The method according to claim 1, further comprising presenting accident risks of said vehicle for an operator of the vehicle.

5. The method according to claim 1, wherein said chosen characteristics of said surroundings passed by the vehicle comprise locations and configurations of fixed objects in said surroundings.

6. A computer program product for assessing accident risks to a moving vehicle, comprising computer program code stored on a non-transitory computer-readable medium for causing an electronic control unit or another computer connected to the electronic control unit to perform method steps according to claim 1 when said computer program code is run on an electronic control unit or another computer connected to said electronic control unit.

7. The method according to claim 1, wherein said portion of said surroundings which has been passed by said front of said vehicle cannot be sensed by said at least one sensor device, said portion of said surroundings including a fixed object, which has been passed by said front of said vehicle and which is located behind said front of said vehicle.

8. A device for assessing accident risks to a moving vehicle comprising:
at least one sensor device for continuously monitoring a configuration of surroundings of said vehicle while said vehicle is in motion; and
a control unit configured to:
continuously register said surroundings configuration in order to create and provide an idea about chosen characteristics of said surroundings passed by said vehicle;
continuously determine running characteristics of said vehicle; use said running characteristics and said idea as a basis for assessing accident risks related to a portion of said surroundings which will be or has been passed by a front of said vehicle, said accident risks including a risk of colliding with a fixed object, which will be or has been passed by said front of said vehicle, when said fixed object is located behind said front of said vehicle; and
calculate said risk of colliding with said fixed object continuously beginning, at a first time, when said fixed object is located in front of said vehicle and ending, at a second time, when said fixed object is located behind said rant of said vehicle,
wherein said second time is determined at said first time based on a predicted path of said vehicle and on said risk of colliding with said fixed object calculated at said first time.

9. The device according to claim 8, wherein said control unit is further configured for taking vehicle configurations into account.

10. The device according to claim 8, wherein said running characteristics comprise future movement paths of said vehicle.

11. The device according to claim 8, further comprising one of a viewing screen, loudspeakers, or light devices for presenting accident risks of said vehicle for an operator of said vehicle.

12. The device according to claim 8, wherein said chosen characteristics of said surroundings passed by said vehicle comprise locations and configurations of fixed objects in said surroundings.

13. A vehicle provided with the device according to claim 8.

14. The vehicle according to claim 13, wherein said vehicle is any from among a truck, bus or car.

15. The method according to claim 8, wherein said portion of said surroundings which has been passed by said front of said vehicle cannot be sensed by said at least one sensor device, said portion of said surroundings including a fixed object, which has been passed by said front of said vehicle and which is located behind Said front of said vehicle.

* * * * *